J. A. MORLING.
COMBINED END GATE AND SHOVELING BOARD.
APPLICATION FILED DEC. 3, 1912.
1,120,734.
Patented Dec. 15, 1914.
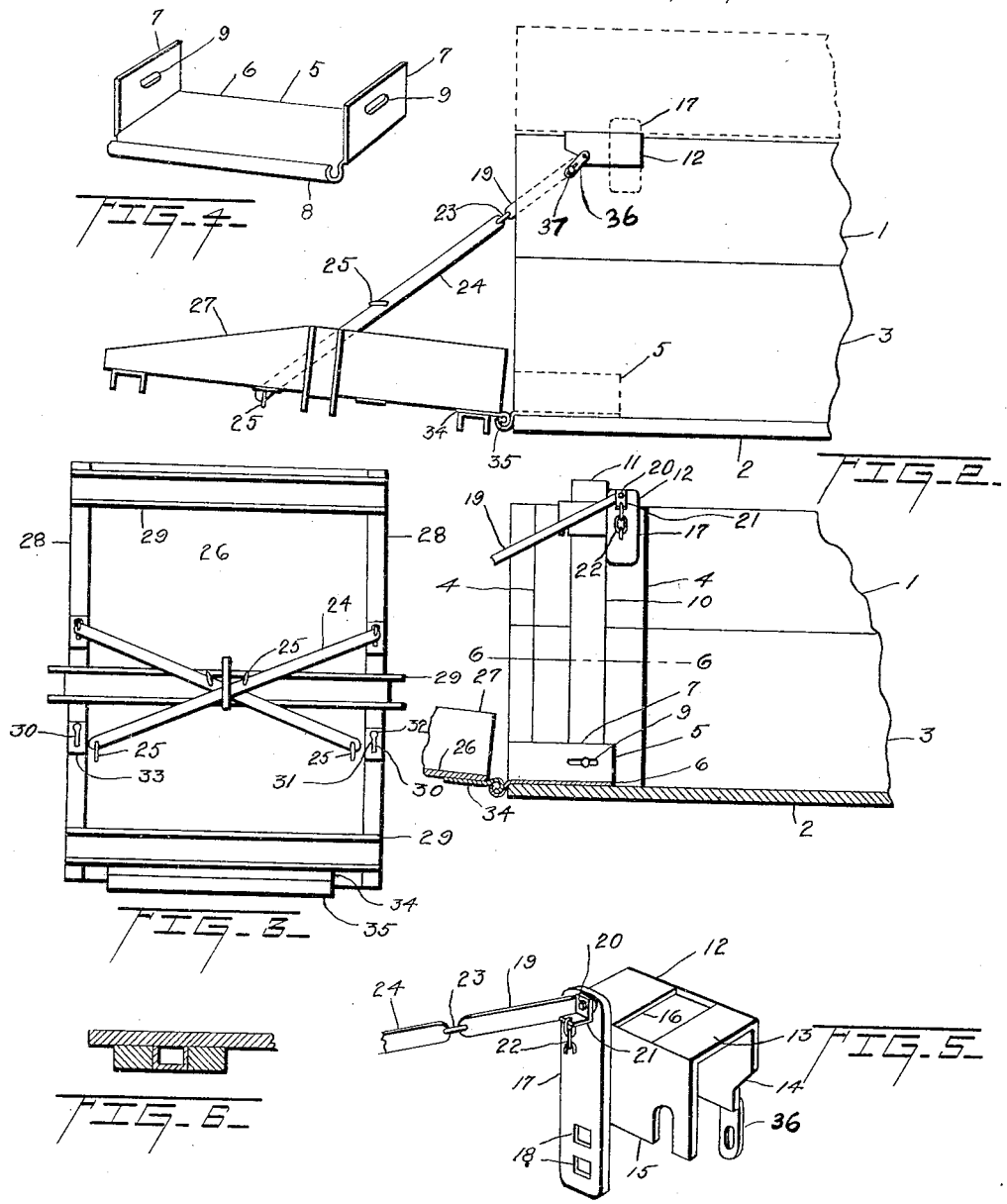
WITNESSES
M. E. Berg.
Mildred J. Boman
INVENTOR.
By John A. Morling
La Pate & Bean
Att'ys.

UNITED STATES PATENT OFFICE.

JOHN A. MORLING, OF CAMERON, ILLINOIS.

COMBINED END-GATE AND SHOVELING-BOARD.

1,120,734.  Specification of Letters Patent.  Patented Dec. 15, 1914.

Application filed December 3, 1912. Serial No. 734,683.

*To all whom it may concern:*

Be it known that I, JOHN A. MORLING, a citizen of the United States, residing at Cameron, in the county of Warren and State of Illinois, have invented certain new and useful Improvements in Combined End-Gates and Shoveling-Boards, of which the following is a specification.

My invention relates to improvements in wagon bodies and particularly to a combined end-gate and shoveling board therefor.

The principal object of my invention is the provision of a device of that character which may be readily applied to a wagon, which is simple in construction and may be readily operated and adjusted as desired.

A further object is the provision of such a device having means to prevent the splitting or chipping of the wagon bed by the shovels.

A further object is the provision of such a device which may be used in connection with wagon bodies of different sizes and which is adjustable to suit various operating conditions.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof and which illustrate a preferred embodiment of my invention, it being understood however that various changes may be made in construction within the scope of the claims without digressing from my inventive idea.

In the drawings:—Figure 1 illustrates a side elevation of the rear portion of a wagon body with my invention applied thereto, parts being shown in dotted lines. Fig. 2 illustrates a vertical section through the middle portion of the rear end of the wagon body and the hinge of the end-gate. Fig. 3 represents a rear view of the end-gate and shoveling board. Figs. 4 and 5 are perspective views of details. Fig. 6 is a horizontal section taken on line 6—6 of Fig. 2.

Broadly considered my invention includes an end-gate and shoveling board detachably mounted on the rear end of a wagon body, this end-gate being provided with apertures to receive supporting arms or rods which have detachable means for mounting them on or connecting them to the wagon body. The end-gate is detachably hinged to a lower part or member which rests on the bottom of the rear portion of the wagon and to which is connected the vertical supporting members which are adapted to be received and positioned between the ordinary cleats of the wagon.

Referring now to the drawings, 1 designates the wagon body, including the bottom 2 and the side boards 3, these side boards being provided with the ordinary strips or cleats 4 near the rear end of the wagon body as shown. Fitted to the bottom of the wagon between the side boards 3, is the member 5 which is substantially rectangular in shape having the flat bottom portion 6 designed to rest on the bottom of the wagon and the vertical portions 7 which are designed to rest along the strips or cleats 4. This member 5 is provided with the rear extension 8 which is dished or curved as shown to provide a semi-tubular portion which forms part of the hinge for the end-gate. These vertical members 7 are provided with the elongated slots 9 by means of which the vertical supporting members 10, preferably in the form of channel iron, are adjustably secured to said members 5. It is to be noted that this vertical supporting member is positioned in the space formed between the cleats 4 and has slidably mounted therein the member or rod, preferably of wood, 11. These vertical supporting members 10, which are on each side of the rear end of the wagon body, act to support the side boards as shown, and further provide the positioning means for the peculiarly shaped bracket member 12 shown in Fig. 5. This bracket member is formed with a horizontal body portion 13 having parallel sides and being of the general shape of a rectangle having the depending outer and inner side portions or members 14 and 15. An aperture 16 is provided in the body portion 13 of said bracket member so as to permit the passage of the member 11 therethrough. To the inner portion or member 15 is attached the bar 17 which has the apertures 18 provided therein. The link 19 is adapted to be secured to said bar 17 by means of a bolt 20 passing through one of said apertures 18. Said bolts 20 also hold plates 21 to which are attached chains 22, said chains from each of said bracket members being connected together so as to hold the parts in position. The link or member 19 is connected by means of the chain link 23 to the supporting arm 24, which is elongated, as shown, and provided with a plurality of holding members in the form of chain links 25. These arms 24 are designed to support the end-gate in various positions by means of the links 25, being adapted to engage the end-gate and hold it.

This end-gate is provided with a back portion 26 and the side portions 27, the latter being preferably of sheet metal and bent over the sides at 28 on the rear portion 26. Channel iron cleats 29 extend transversely across said end-gate, the intermediate one of said cleats being longer than the others and bent upon and united to the side members 27, as at 29. Formed in the end-gate are the apertures 30, which as shown, have the vertically extending slots 31 and the enlarged circular end portions 32, with the suitable metallic facing 33, having a corresponding aperture formed therein. It is to be noted that these apertures are substantially the same shape as a key-hole. Along the lower edge of the end-gate is provided the member 34, which has a lower extension bent or curved as at 35 to form a hinge member corresponding to the hinge member 8 of the bottom member 5. These members are so shaped that when the end-gate is closed or partially closed, that they cannot be disconnected but when the end-gate is in a position parallel or approximately parallel with the bottom of the wagon the end-gate can be lifted off of the hinge member 8.

As shown in Fig. 1, the arms 24 are adapted to extend through the apertures 30 and have the links 25 engage the lower edge of said apertures to support the end-gate in an adjusted position. When the end-gate is closed the chain link 23 may be drawn through the circular portion 32 of the aperture and allowed to descend into the vertical slot 31, thereby permitting the arms 24 to be placed in a crossed position and held, as shown in Fig. 3.

It is evident from the preceding description that this device provides a simple, strong and efficient support for the end-gate as the member 12 is locked in position by means of the channel iron member 10 and vertically extending member 11. Further than that this attachment may be adjusted to suit various types of wagons and various working conditions, and is provided with a bottom plate which protects the bottom of the wagon from chipping by the shovels. In case the device is used on rough ground, an additional safety device is provided to prevent the members 12 from jostling or being accidentally thrown off of the side members 3 and the vertical member 11. This device takes the form of the link arm 36 adapted to be locked over the bolt or pin 37, as shown in Fig. 2.

What I claim is:—

1. In a wagon body having side boards with spaced strips or cleats near the rear end portions thereof, supporting members mounted in the spaces between said strips or cleats, a bottom plate member adapted to rest on and extend across the bottom of the wagon body, said supporting members being adjustably secured to said plate member, bracket members adapted to be mounted on the side boards and having extended bearing portions or lugs adapted to rest against the outside and inside of said side boards, each of said bracket members having an aperture to receive one of said supporting members, an end-gate adapted to be pivotally connected to said plate member, and means connected to said bracket members for holding said end-gate in adjusted positions relative to said wagon body.

2. In combination with a wagon body having side boards with spaced strips or cleats near the end portions thereof, supporting members mounted in the spaces between said strips or cleats, a bottom plate member adapted to rest on the bottom of the wagon body, said supporting members being adjustably secured to said plate member, bracket members adapted to be mounted on the side boards and having extended bearing portions or lugs adapted to rest against the outside and inside of said side boards, said bracket members being held in position by said supporting members, a link member secured to each bracket member and adapted to be connected to one of said side boards, an end-gate pivotally mounted on said body, and means connected to said bracket members for holding said end-gate in adjusted positions relative to said wagon body.

In testimony whereof I affix my signature, in presence of two witnesses.

JOHN A. MORLING.

Witnesses:
  W. C. WHITMAN,
  J. T. HARNEY.

Copies of this patent may be obtained for five cents each, by addressing the "Commissioner of Patents, Washington, D. C."